United States Patent [19]
Uchida et al.

[11] Patent Number: 4,881,268
[45] Date of Patent: Nov. 14, 1989

[54] PAPER MONEY DISCRIMINATOR

[75] Inventors: Shinya Uchida, Kanagawa; Kazuya Kohzu, Nagano; Kiyoshi Fujii, Tokyo; Moriatsu Kawakami, Kanagawa, all of Japan

[73] Assignee: Laurel Bank Machines Co., Ltd., Tokyo, Japan

[21] Appl. No.: 56,716

[22] Filed: Jun. 2, 1987

[30] Foreign Application Priority Data

Jun. 17, 1986 [JP] Japan .................. 61-140879
Jun. 17, 1986 [JP] Japan .............. 61-92225[U]

[51] Int. Cl.⁴ .................................. G06K 9/00
[52] U.S. Cl. ............................ 382/7; 356/71; 250/556
[58] Field of Search .............. 382/7, 34, 65–67; 209/534; 194/206, 207; 356/71; 235/379, 454, 465; 340/825.34, 825.35; 358/75; 250/226, 227, 556

[56] References Cited

U.S. PATENT DOCUMENTS

| | | | |
|---|---|---|---|
| 3,782,543 | 1/1974 | Martelli et al. | 209/534 |
| 4,183,665 | 1/1980 | Iannadrea et al. | 356/71 |
| 4,204,765 | 5/1980 | Iannadrea et al. | 356/71 |
| 4,293,188 | 10/1981 | McMahon | 356/395 |
| 4,302,109 | 11/1981 | Davies | 356/395 |
| 4,413,276 | 11/1983 | Hertz et al. | 358/75 |
| 4,487,306 | 12/1984 | Nao et al. | 382/7 |
| 4,490,740 | 12/1984 | Moriguchi | 358/75 |
| 4,524,276 | 6/1985 | Ohtombe | 250/338 |
| 4,531,230 | 7/1985 | Brogardh | 382/65 |
| 4,592,090 | 5/1986 | Curl et al. | 209/534 |
| 4,618,257 | 10/1986 | Bayne et al. | 250/556 |
| 4,650,320 | 3/1987 | Chapman et al. | 356/71 |
| 4,748,680 | 5/1988 | Margolin | 382/65 |

FOREIGN PATENT DOCUMENTS 47-39435 10/1972 Japan .
51-6597 1/1976 Japan .
51-84695 7/1976 Japan .

Primary Examiner—David K. Moore
Assistant Examiner—Jose L. Couso
Attorney, Agent, or Firm—Fleit, Jacobson, Cohn, Price, Holman & Stern

[57] ABSTRACT

A paper money discriminator for identifying the type of a bank note by detecting colors thereof from reflected or transmitted light obtained by irradiating the bank note. The paper money discriminator is provided with optical fiber bundles disposed so as to respectively face a light source and color detecting sensors, and color filters disposed in positions adjacent to the color detecting sensors. The top ends of the optical fiber bundles face an inspection point on the bank note. The paper money discriminator is provided with identifying systems each of which is composed of a detecting unit, a calculating unit and a money type identifying unit and is adapted for detecting reflected or transmitted light in the form of two separated color components issuing from a type of bank note, obtaining the ratio of these components, and comparing a signal representing a calculated pattern with the reference pattern signals, thereby identifying the money type. The discriminator also has a money type determining unit which determines the type of bank note when all of the money types respectively identified by the identifying systems coincide with each other. In this discriminator, at least one of the detecting units in the identifying systems is positioned such as to be capable of detecting a watermark portion of the bank note.

3 Claims, 5 Drawing Sheets

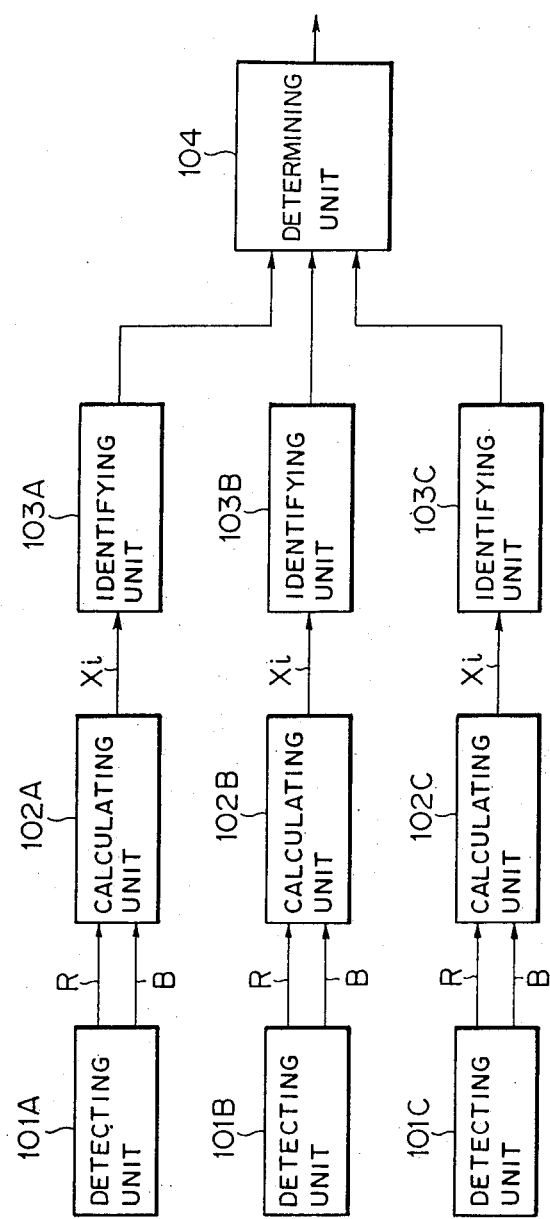
F I G. 5

PAPER MONEY DISCRIMINATOR

BACKGROUND OF THE INVENTION

This invention relates to a paper money discriminator for identifying the type of a bank note by detecting colors thereof from reflected or transmitted light obtained by irradiating the bank note.

Generally, a paper money discriminator identifies printed patterns and the like formed on a bank note by detecting colors thereof from reflected or transmitted light obtained by irradiating the bank note, thereby identifying the type of the bank note or judging whether the bank note is genuine or counterfeit.

Japanese Patent Publication No. 39435/1972 and Japanese Patent Public Disclosure No. 84695/1976 disclose a type of paper money discriminator which has a plurality of light sources capable of irradiating the surface of a bank note from positions thereabove, and a plurality of color detecting sensors for receiving, through color filters, reflected or transmitted light traveling by way of the bank note, the plurality of color detecting sensors being disposed close to the bank note.

However, in this type of paper money discriminator, the spaces in which the light sources and the color detecting sensors are disposed are comparatively large, and, if the area of irradiation and/or the number of color detecting sensors are increased, these light sources and color detecting sensors are concentrated in a limited inspection space, and the disposition of the light sources and the sensors is respectively restricted. For this reason, the construction of this type of discriminator tends to be complicated.

A type of bank note discriminator such as the one disclosed in Japanese Patent Public Disclosure No. 6597/1976 has previously been known in which a type of bank note is identified on the basis of a brightness pattern detected from reflected or transmitted light obtained by irradiating the bank note.

The above-mentioned Japanese Patent Public Disclosure No. 84695/1976 discloses an example of another type of bank note discriminator in which reflected or transmitted light obtained by irradiating a bank note is detected after being separated into lights of two different wavelengths (red light and infrared light) and the bank note is judged to be genuine or counterfeit on the basis of the ratio of outputs from detected light or the difference between the same.

The identification of the type of bank note and/or the discrimination of a real one from a counterfeit is carried out by combining the outside dimensions or magnetic patterns with the above types of optical pattern or color discrimination.

The manner of discrimination in the first of the above-described conventional systems is based on a so-called method of using monochrome densities, and thus it cannot even recognize the difference between a bank note and a counterfeit note (monochromic copy). The latter is capable of discriminating a bank note from a color-copy counterfeit or a color-printed counterfeit but incapable of identifying the type of bank note. An additional means of identification is therefore required.

SUMMARY OF THE INVENTION

It is an object of the present invention to provide a paper money discriminator which is free from the above-described problems and which has a simple construction.

It is another object of the present invention to provide a bank note discriminator which is capable of identifying a type of bank note by detecting a color pattern and is also capable of discriminating color-copy counterfeit notes or color-printed counterfeit notes.

In one aspect, the present invention provides a paper money discriminator for identifying the type of a bank note by detecting colors thereof from reflected or transmitted light obtained by irradiating the bank note, in which optical fiber bundles are disposed so as to respectively face a light source and color detecting sensors, the top ends of the optical fiber bundles facing an inspection point at which the bank note is supported, and in which color filters are disposed in positions adjacent to the color detecting sensors.

In this paper money discriminator, the provision of optical fiber bundles capable of transmitting light enables the light source and the color detecting sensors to be placed in positions remote from the inspection region, thereby reducing the restriction on the disposition of each of the light source and the color detecting sensors. Also an optical fiber bundle composed of the optical fiber bundles has a comparatively small diameter and a simple structure. For these reasons, the structure near the inspection region can be simplified.

In another aspect, the present invention provides a bank note discriminator having: detecting units for detecting two different color components separated from reflected or transmitted light which issues from a traveling bank note of a certain type, the detecting units being disposed at a plurality of positions arranged in the widthwise direction of the bank note being transported; calculating units provided with respect to the plurality of detecting units, each calculating unit being adapted for obtaining, in accordance with a time series, the ratio of two color components supplied from corresponding one of the detecting units; money type identifying units provided with respect to the plurality of calculating units, each money type identifying unit successively comparing a pattern signal calculated in a time series by corresponding one of the calculating units from the two color components with reference patterns previously formed and stored in a time series with respect to different money types, and each money type identifying unit identifying a money type when judging that the sum of the difference between the pattern signal and one of the reference patterns falls within a predetermined range; and a money type determining unit which determines the type of traveling bank note as identified by the plurality of money type identifying units when all of the money types respectively identified by the money type identifying units coincide with each other; wherein at least one of the detecting units which are disposed at the plurality o positions arranged in the widthwise direction of the traveling bank note is positioned such as to be capable of detecting a watermark portion of the traveling bank note.

In this arrangement, each identifying system composed of the detecting unit, the calculating unit and the money type identifying unit detects reflected or transmitted light in the form of two separated color components, obtains the ratio of these components, and compares a signal representing a calculated pattern with the reference pattern signals, thereby identifying a bank note or judging the same to be counterfeit.

At least one of the identifying systems is capable of detecting a watermark portion of the bank note. Since the difference between the quantity of paper with respect to the real bank note and a color-copy counterfeit or a color-printed counterfeit is more discriminative at the watermark portion, only real bank notes are positively identified.

The type of bank note is determined only when all the money types identified by the identifying systems coincide with each other.

BRIEF DESCRIPTION OF THE DRAWINGS

FIG. 5 is a block diagram of the entire constitution of the embodiment;

DESCRIPTION OF THE PREFERRED EMBODIMENTS

A paper money discriminator typical of embodiments of the present invention will be described below with reference to the accompanying drawings.

Figure 1:
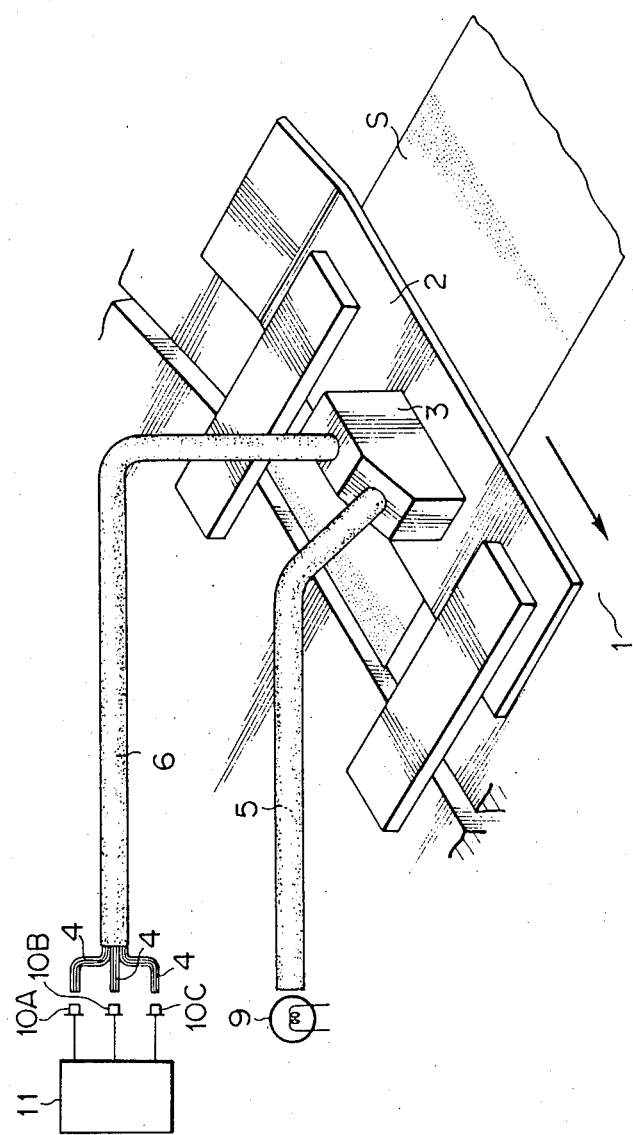
FIG. 1 is an illustration of a paper money discriminator which is an embodiment of the present invention.
Figure 2:
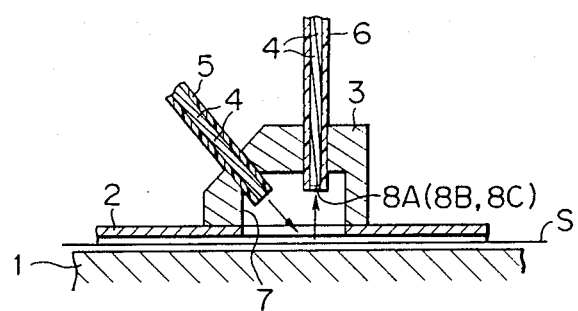
FIG. 2 is a cross-sectional view of a support block and other related members of the discriminator shown in FIG. 1.
Figure 3:
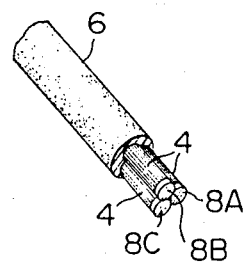
FIG. 3 is a perspective view of the top end of a light receiving optical fiber cable.

FIGS. 1 to 3 show a paper money discriminator embodying the present invention which is provided with a paper money transportation path 1 along which a bank note S is transported in the direction indicated by the arrow in FIG. 1 with its surface facing the path. A guide plate 2 which prevents the bank note S from floating is disposed midway on the paper money transportation path 1. A light projecting optical fiber cable 5 and a light receiving optical fiber cable 6 each of which is composed of a bundle of a plurality of optical fiber bundles 4 are inserted into and attached to a support block 3 which is fixed to the upper surface of the guide plate 2. The top ends of the optical fiber cables 5 and 6 are held such as to face a certain position on the upper surface of the paper money transportation path 1 through an aperture 7 formed in the support block 3, as shown in FIG. 2. In this embodiment, as shown in FIG. 3, the light receiving fiber cable 6 has three optical fiber bundles 4, and color filters 8A, 8B and 8C which are separately provided with respect to primary colors and which permit only light of specific frequencies to pass therethrough are disposed at the top ends of the optical fiber bundles 4. A light source 9 is disposed near the root end of the light projecting optical fiber cable 5 such as to project light to the end surface thereof. Color detecting sensors 10A, 10B and 10C are disposed near the root end of the light receiving optical fiber cable 6 such as to respectively face the end surfaces of the optical fiber bundles 4, and a discrimination circuit 11 is connected to the color detecting sensors 10A, 10B and 10C.

The paper money discriminator thus constituted transmits light from the light source 9 by way of the light projecting optical fiber cable 5, irradiates the surface of the bank note S on the paper money transportation path 1 with light emitted from end surfaces of the optical fiber bundles 4 of this fiber cable 5, receives reflected light therefrom by the end surfaces of the optical fiber bundles 4 of the light receiving optical fiber cable 6 through the color filters 8A, 8B and 8C, transmits this light to the color detecting sensors 10A, 10B and 10C, and carries out discrimination in the discrimination circuit 11. In this arrangement, the light source 9 and the color detecting sensors 10A, 10B and 10C are remote from the paper money transportation path 1, and they may be disposed, for example, in a side portion of the body of a bank note depositing machine in which this paper money discriminator is incorporated, thereby facilitating maintenance, overhauling and so forth. In addition, the diameter of each of the optical fiber cables 5 and 6 disposed near the paper money transportation path 1 is small (e.g., not more than 5 mm$\phi$), so that the structure around this portion can be simplified.

Figure 4:
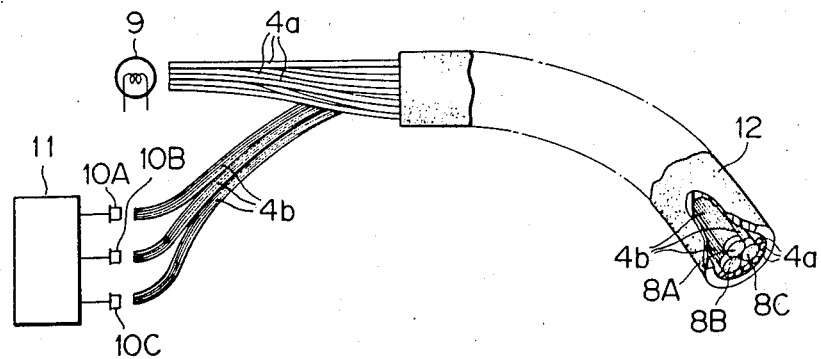
FIG. 4 is an illustration of another embodiment of the present invention a part of which is omitted.

FIG. 4 shows another embodiment of the present invention in which a plurality of light projecting optical fiber bundles 4a are disposed such as to encircle light receiving fiber bundles 4b, thereby constituting an optical fiber cable 12 and in which the light projecting optical fiber bundles 4a and the light receiving optical fiber bundles 4b are ramified from the optical fiber cable 12 and are positioned such as to respectively face the light source 9 and the color detecting sensors 10A, 10B and 10C, thereby effecting irradiation and reception of light through one optical cable.

In the paper money discriminator in accordance with the present invention, transmitted light may be used to effect discrimination, and the number of color filters and the kinds of color thereof are not limited as described above with respect to the first embodiment. Also the color filters may be placed in any positions other than those in front of the top end surfaces of the optical fiber bundles so long as the filters are disposed in the optical paths leading to the color detecting sensors. The color filters may be of an optical type or an electric type.

As described above, the paper money discriminator in accordance with the present invention has the following advantages.

(i) Since light is transmitted by way of the optical fiber cables, the light source and the color detecting sensors can be placed in positions remote from the inspection region, thereby reducing the restriction on the disposition of each of the light source and the color detecting sensors. Also the optical fiber cable itself has a comparatively small diameter and a simple structure. For these reasons, the structure near the inspection region can be simplified.

(ii) Since the optical fiber bundles can be freely bent, they are easy to deal with, and it is possible to arrange a plurality of optical fiber bundles in such a manner that different portions of a bank note can be irradiated with light issuing from only one light source. It is also possible to effect discrimination with high accuracy by receiving reflected or transmitted light after subdividing the same by means of a plurality of optical fiber bundles. The applicability of the discriminator is therefore improved.

The second embodiment according to the present invention which utilizes the construction of the above-mentioned paper money discriminator will now be described with reference to FIGS. 5 to 8.

FIG. 5 shows a block diagram of the entire paper money discriminator which represent a preferred embodiment of the present invention.

The discriminator in accordance with the present invention has detecting units 101A to 101C each of which separates reflected or transmitted light issuing from traveling bank notes S into two color components such as red (wavelength: 610 nm) and blue (wavelength: 450 nm) and thereafter outputs detection signals R and B.

Figure 6:
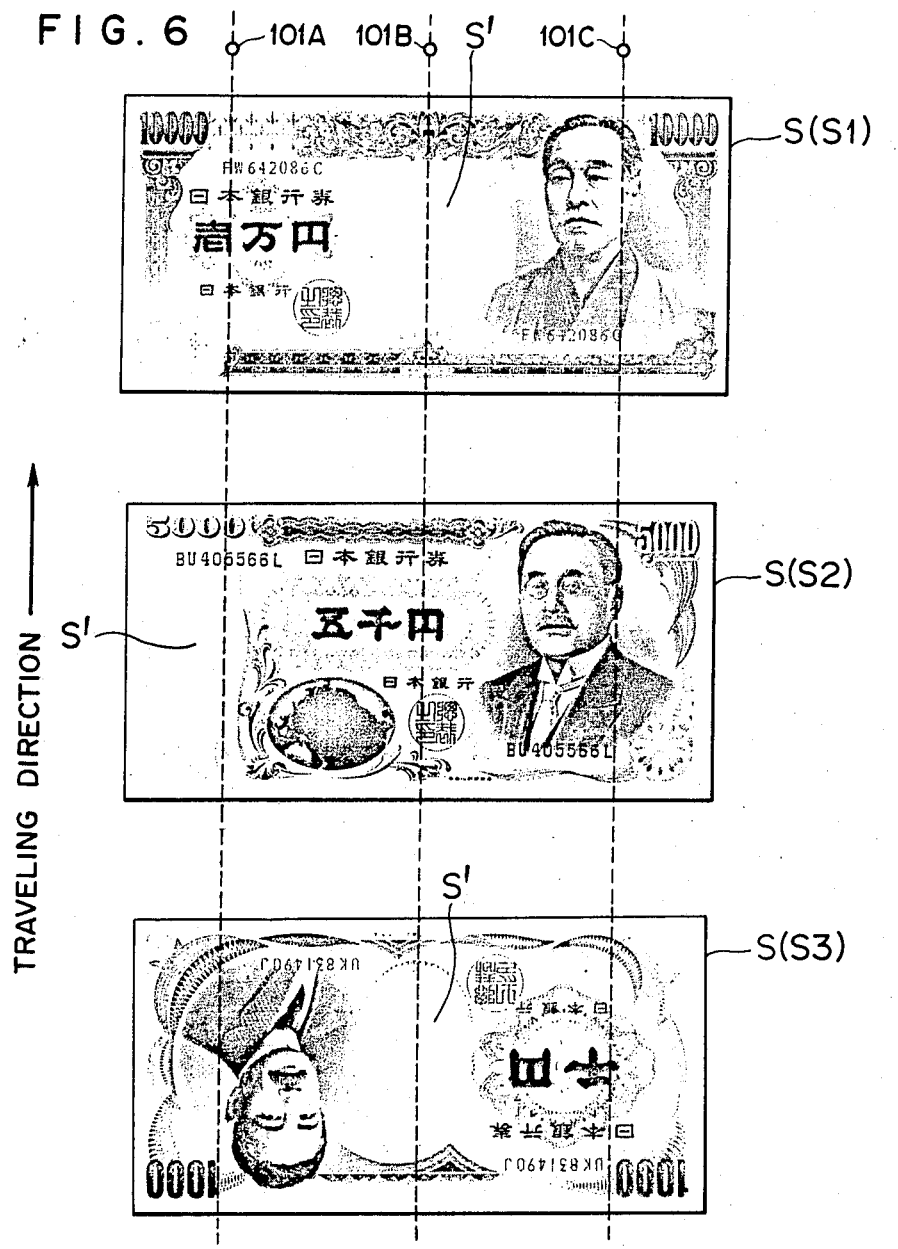
FIG. 6 is a diagram of the relationship between bank notes and the positions of detecting units.

As is clear from FIG. 6 which illustrates the relationship between the traveling bank notes S and the positions of the detecting units 101A to 101C, the detecting units 101A to 101C are disposed at positions in which they can detect a plurality of portions of the bank notes S spaced apart in the widthwise direction thereof while the banknotes S are being transported in the direction indicated by the arrow in FIG. 6. At least one of the plurality of detecting units 101A to 101C is disposed at a position in which it can detect a watermark portion S' of one of the bank notes S which is being transported.

As shown in FIG. 6, the bank notes S are exemplified by a ten-thousand-yen note S1, a five-thousand-yen note S2 and a thousand-yen note S3.

Figure 7:
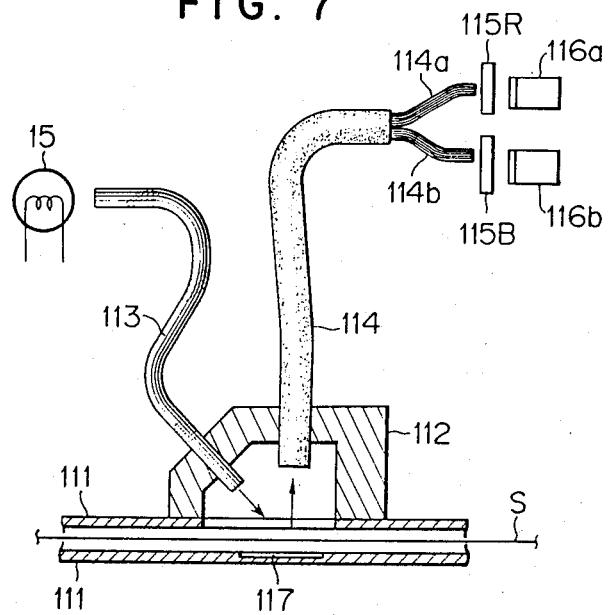
FIG. 7 is an illustration of an example of a detecting unit of a reflected light detection type.

FIG. 7 shows an example of any one of the detecting units 101A to 101C which is of a reflected light detection type.

In this example, optical fibers are utilized in order to facilitate the mounting of detecting elements and the like on a bank note carrying unit. A support block 112 is attached to one of guide plates 111 which guide the bank notes S which are being transported. A light projecting fiber cable 113 and light receiving fiber cable 114 are inserted into and supported by the support block 112.

A light projecting lamp 115 (e.g., a halogen lamp) is provided at the end surface of the root portion of the light projecting fiber cable 113.

The light receiving fiber cable 114 is composed of two optical fiber bundles 114a and 114b, and light receiving elements 116a and 116b are disposed such as to face the surfaces of the outgoing ends of the optical fiber bundles 114a and 114b through the medium of optical filters 115R and 115B (color filters) which permit only light of above-described particular wavelengths (R=610 nm, B=450 nm) to pass therethrough.

The optical filters 115R and 115B may be disposed such as to face the surfaces of the light receiving ends of the two groups of optical fiber bundles 114a and 114b disposed in the support block 112.

To evade errors in discrimination due to fluctuations in the light intensity level of received light caused by variation of ambient temperature in the process of comparison and discrimination carried out by using signals detected by the light receiving elements 116a and 116b, a compensating plate 117 (e.g., a monochromic plate such as a white plate) for detecting the light intensity level when discrimination is not effected may be disposed on guide plates 111 which face the support block 112.

The compensating plate 117 is only applicable to discriminators of the same type as the reflected light detection type in accordance with this embodiment. A discriminator of the transmitted light detection type (not shown) may be arranged in such a manner that projected light can be directly received so as to effect compensation by detecting the light intensity level when discrimination is not effected.

Referring back to FIG. 5, the discriminator in accordance with the present invention is also provided with calculating units 102A to 102C each of which is adapted for obtaining, in accordance with a time series, the ratio X of the detected signals R and B ($X=R/B$) corresponding to the two color components obtained by each of the detecting units 101A to 101C, thereby making calculated pattern signals Xi ($Xi=Ri/Bi$) in time series.

In order for the calculating units 102A to 102C to obtain the calculated pattern signal Xi by compensating the detection signals R and B, each of the calculating units 2A to 2C may detect and store signals which issue when discrimination of bank notes is not effected, namely, offset signals Ros and Bos and carry out calculations:

$$Xi=(Ri/Ros)/(Bi/Bos)=(Ri\times Bos)/(Bi\times Ros).$$

The discriminator in accordance with the present invention is further provided with money type discriminating units 3A to 3C each of which successively compares the calculated pattern signal in a time series obtained by corresponding one of the calculating units on the basis of the two color components with reference pattern signals $Ki-n$ ($n=1$ to 12: 3 money types $\times$ 4 directions = 12 patterns) in time series previously stored with respect to different money types and each of which identifies a money type when judging that the sum Y of the difference between the pattern signal and one of the reference patterns falls within a predetermined range.

That is, a calculation: $Y=\Sigma(Xi-Ki-n)$ is carried out, thereby selecting one of the reference pattern signals $Ki-n$ which satisfies a condition:

$$Y<\text{Const.}$$

As is clear from the above description, it is possible to ascertain, as well as the money type, the direction of each bank note in which the top or the bottom of the note faces or in which the normal or the reverse surface of the note faces. Each of the money type identifying units 3A to 3C incorporates a memory (not shown) for storing the above reference pattern signals $Ki-n$, but otherwise the memory may be provided as a separated part.

The discriminator in accordance with the present invention is further provided with a money type determining unit 104 which determines the type of traveling bank note S as identified by the money type identifying unit 103A to 103C when all of the money types respectively identified by the money type identifying units 3A to 3C coincide with each other.

It goes without saying that the money type determining unit 104 outputs a counterfeit-note signal when one of the money type identifying units 103A to 103C identifies a different money type or direction or judges that it is impossible to identify the note (it is not possible for any counterfeit note to be identified).

The operation of the discriminator in accordance with the present invention will be described below.

When the bank notes S are transported between the guide plates 111, reflected or transmitted light issuing from each bank note S is detected by the detecting units 101A to 101C while being separated into the two color components R and B, and the ratio X=R/B thereof is obtained in each of the calculating units 102A to 102C.

The calculated pattern signals Xi which are obtained by the calculating units 102A to 102C are compared with the reference pattern signals Ki-n in the money type identifying units 103A to 103C, thereby identifying the money type (and the direction) or judging that the note is counterfeit.

At least one of the detecting units 101A to 101C is capable of detecting the watermark portion S' of one of the bank notes S. Since the difference between the quantity of paper with respect to the bank note S and a color-copy counterfeit or a color-printed counterfeit is more discriminative at this watermark portion S', only the type of real bank notes is positively identified.

Figure 8:
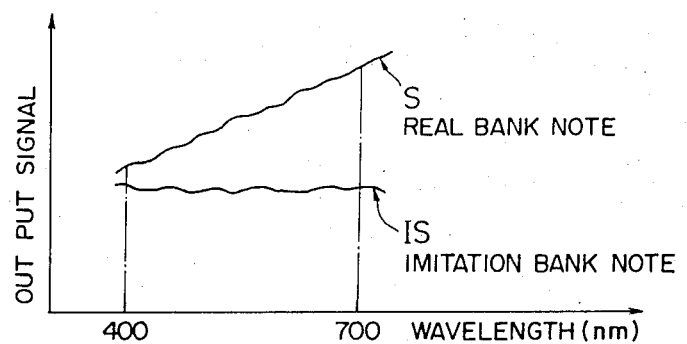
FIG. 8 is a graph of the difference between output signals in relation to wavelengths obtained at watermark portions of a real bank note and a counterfeit note.

That is, as shown in FIG. 8, which shows the difference between output signals in relation to different wavelengths, the level of the output signal obtained at the watermark portion S' of one of the real bank notes S tends to increase as the wavelength increases. In contrast, in the case of a corresponding imitation note IS such as a color-copy imitation or a color-printed imitation, the level of the output signal tends to be constant at different wavelengths.

Accordingly, in the case of a color-copy imitation note or a color-printed imitation note, the calculated pattern signal Xi obtained at the watermark portion S' of this note largely differs from the reference pattern signals Ki-n with respect to one of the identifying systems (detecting units 101A to 101C, the calculating units 102A to 102C and the money type identifying units 103A to 103C) which detects the watermark portion S' of corresponding one of the real bank notes S. The imitation note is thereby judged to be non-identifiable (counterfeit).

The money type determining unit 104 outputs a money-type signal (also capable of outputting a signal which represents the direction) only when all of the money types identified by the money type identifying units 103A to 103C coincide with each other. If one of the money type identifying units 103A to 103C identifies a different money type or direction or judges that the note is non-identifiable, the money type determining unit 104 outputs a counterfeit-note signal.

According to the present invention, as described above, reflected or transmitted light is detected after being separated into two color components, the ratio of these components is obtained, and a signal representing a calculated pattern is compared with the reference pattern signals, thereby identifying a bank note or judging the same to be counterfeit. At least one of the identifying systems is arranged so that it can detect the watermark portion of a type of bank note and detect the difference between the quantity of paper at the watermark portion with respect to the real bank note and a color-copy counterfeit or a color-printed counterfeit, thereby identifying only the real bank note. The type of bank note is determined only when all the money types identified by the identifying systems coincide with each other. Therefore, it is possible for the discriminator in accordance with the present invention to discriminate any color-copy imitation note or color-printed imitation note as well as ascertain the type of the bank note by detecting color patterns specific to this bank note.

What is claimed is:

1. A bank note discriminator comprising:
   light projecting means for projecting light onto a bank note being transported, said light projecting means including a light source and optical fiber bundles for transmitting light from said light source to the surface of the bank note;
   a plurality of detecting means for detecting reflected or transmitted light which issues from a bank note of a certain type in response to the projection of light thereon, said plurality of detecting means being arranged in the widthwise direction of the bank note being transported, each of said plurality of detecting means including optical fiber bundles for transmitting reflected or transmitted light;
   two color filter means provided in said optical fiber bundles with respect to each of said plurality of detecting means and selectively transmitting two color components different from each other;
   a plurality of calculating means provided with respect to said plurality of detecting means, each calculating means being connected to said optical fiber bundles of one of said plurality of detecting means for producing, in accordance with a time series, the ratio of two color components supplied from said one of said plurality of detecting means;
   a plurality of money type identifying means provided with respect to said plurality of calculating means, each money type identifying means successively comparing a pattern signal calculated in a time series by corresponding one of said calculating means from said two color components with reference patterns previously formed and stored in a time series with respect to different money types, and each money type identifying means identifying a money type when judging that the sum of the difference between the pattern signal and one of said reference patterns falls within a predetermined range;
   a money type determining means which determines a type of the transported bank note as identifies by said plurality of money type identifying means when all of the types of money respectively identified by said money type identifying means coincide with each other; and
   at least one of said plurality of detecting means which are arranged in the widthwise direction of the bank note being transported is positioned such as to be capable of detecting a watermark portion of the bank note being transported.

2. A paper money discriminator in accordance with claim 1, wherein said optical sensor means includes at least two optical sensors for detecting different color components of reflected or transmitted light and said color filter means includes at least two color filters, each being disposed in a position adjacent to one of said optical sensors and capable of selectively transmitting a color component detectable by the optical sensor which is positioned adjacent thereto.

3. A bank note discriminator in accordance with claim 2, wherein said two color filter means are provided at the end of said optical fiber bundles adjacent to said plurality of calculating means.

* * * * *